United States Patent Office 3,175,979
Patented Mar. 30, 1965

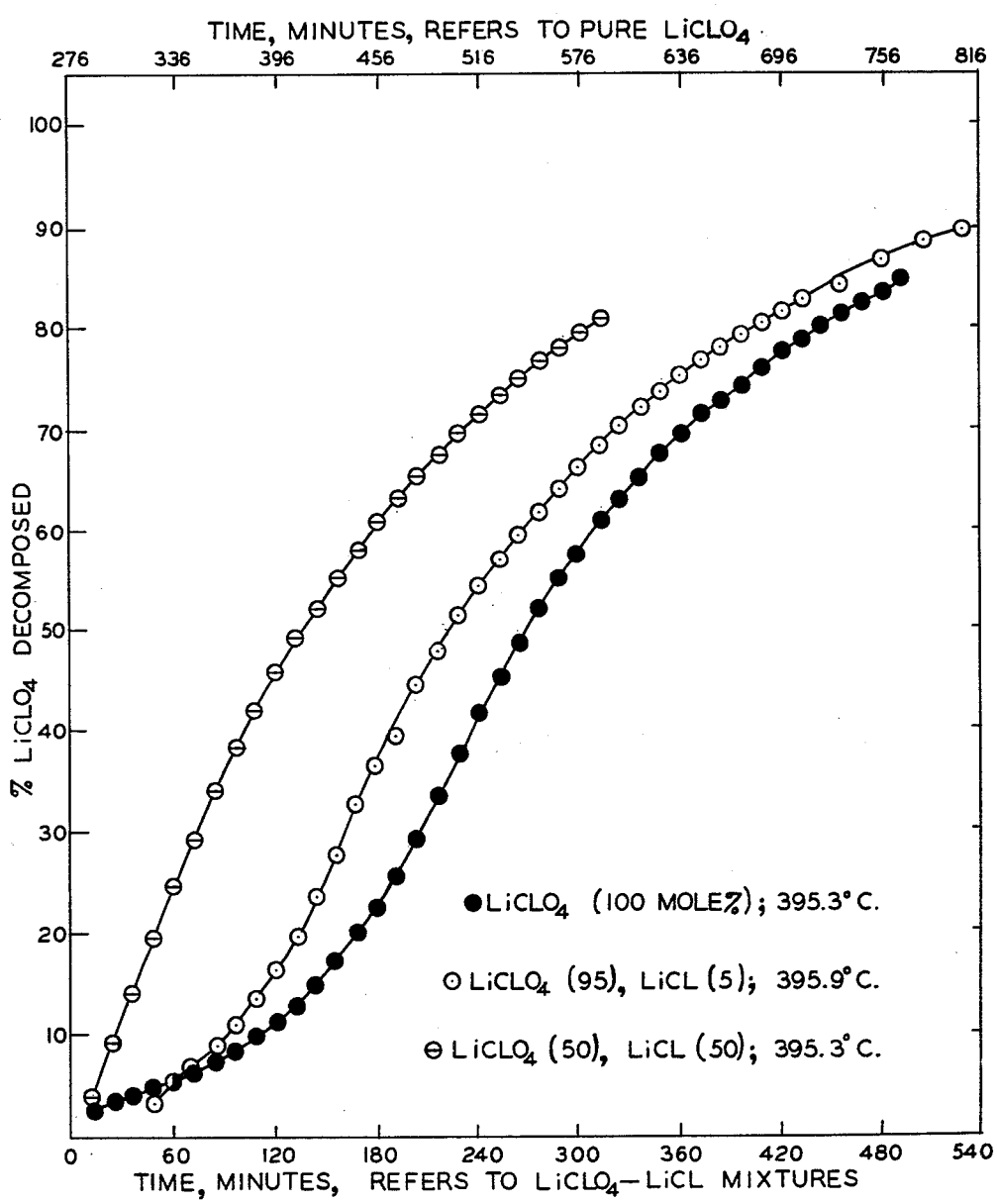

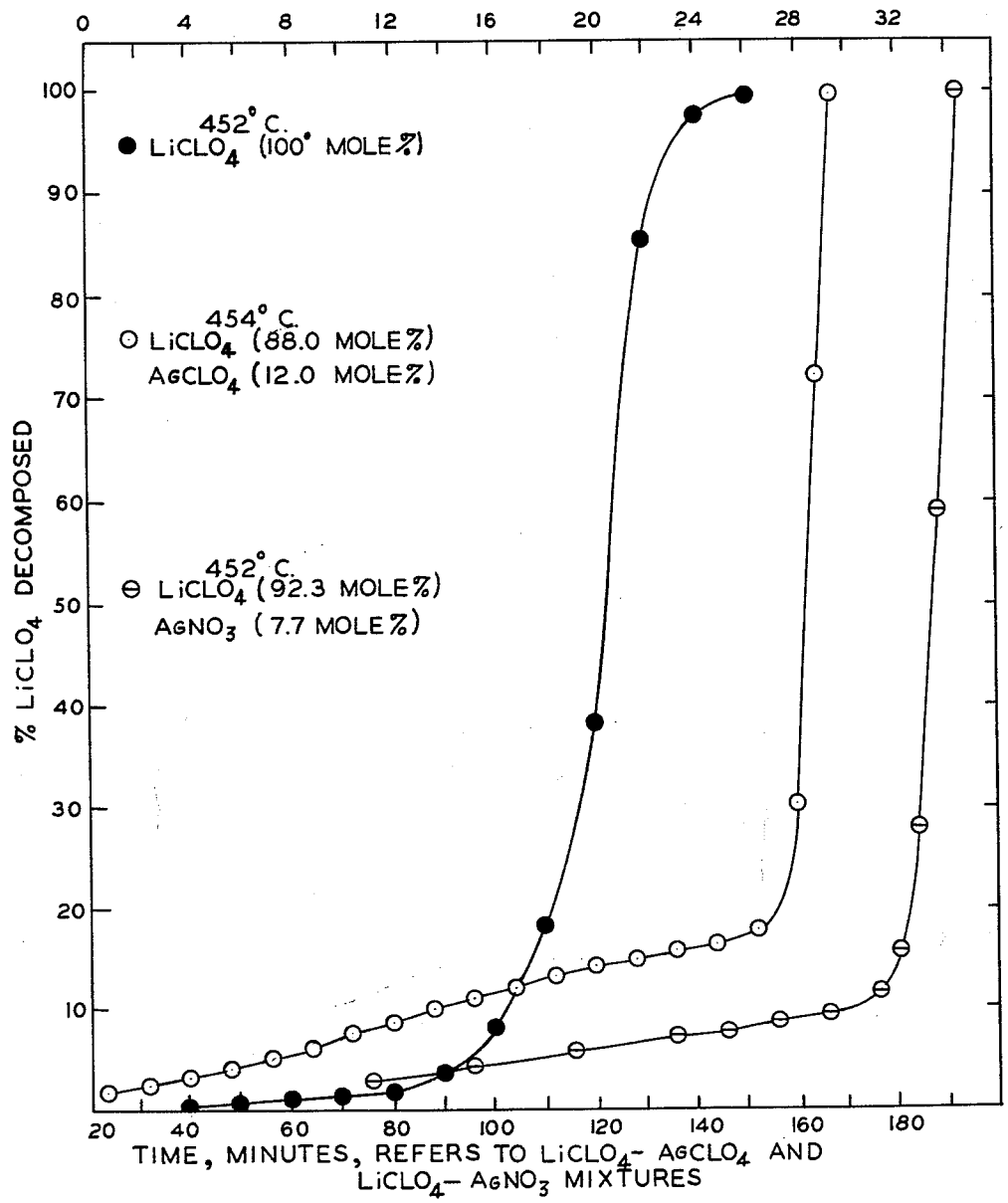

3,175,979
CONTROLLING THE DECOMPOSITION RATE OF LITHIUM PERCHLORATE
Meyer M. Markowitz, Ardmore, Pa., assignor to Foote Mineral Company, Philadelphia, Pa., a corporation of Pennsylvania
Filed Sept. 22, 1961, Ser. No. 140,042
10 Claims. (Cl. 252—186)

This invention relates to lithium perchlorate, and more particularly, provides a novel method of controlling the decomposition rate of lithium perchlorate and novel compositions wherein the decomposition rate of lithium perchlorate is controlled.

The perchlorates are employed in a variety of applications wherein release of a gas, in particular, of active oxygen, is desired. For example, they are used as solid propellants for rockets, gas generators for pumps, emergency sources of oxygen, and in pyrotechnics and explosives as oxidizing agents.

The perchlorates can be caused to decompose by heating them. However, it is sometimes necessary or desirable to control the rate of oxygen evolution or decomposition rate of the perchlorates or systems comprising them in such applications, so that when decomposition is initiated by heating, the length of time required for complete decomposition will be varied. This is frequently found to be difficult or impossible.

To achieve deceleration of the decomposition of perchlorates is particularly difficult. Few, if any, methods are known of stabilizing a perchlorate by introducing an additive so that it will decompose at a slower than normal rate.

Acceleration of the decomposition of perchlorates is somewhat easier to achieve. Thus, it is known that heavy metal salts generally catalyze or accelerate decomposition of perchlorate salts. In particular, this is known of the potassium and ammonium perchlorates. However, introduction of such accelerators introduces foreign matter into the perchlorate, which is sometimes objectionable, as for example, because of incompatibility with other components of the system, producing a composite product which is less stable, more difficult to handle, and so forth. Where possible, it is desirable to effect acceleration using materials which will not introduce a residue of ions other than those which would be normally present subsequent to the decomposition of the perchlorate. For example, in rocket propellant systems, it is desirable to minimize to the greatest extent possible the number of constituent elements in the propellant system.

It is an object of this invention to provide a novel method of controlling the rate of oxygen evolution or decomposition rate of a perchlorate or systems comprising a perchlorate.

It is a particular object of this composition to provide methods for accelerating and for decelerating the rate of oxygen evolution or decomposition rate of lithium perchlorate or systems comprising lithium perchlorate.

Another object of this invention is to provide compositions comprising lithium perchlorate in which the lithium perchlorate or a system comprising it exhibits a rate of oxygen evolution or decomposition rate different from that normally exhibited by pure lithium perchlorate.

These and other objects will become evident from a consideration of the following specification and claims.

It has now been found that a source of an inorganic chloride, and particularly, of lithium chloride, acts as an effective accelerator of the decomposition of lithium perchlorate, and that a heavy metal salt other than a chloride, and in particular, a silver salt like silver nitrate or perchlorate, acts as an effective retardant of the decomposition of lithium perchlorate.

Where reference is made here and in the specification and claims hereinafter to the decomposition rate of lithium perchlorate, this is to be understood as referring to the rate of oxygen evolution or decomposition rate of lithium perchlorate or a system comprising lithium perchlorate.

The invention will be more readily understood from a consideration of the drawings, in which:

FIGURE 1 illustrates the curves for extent of decomposition plotted against time for pure lithium perchlorate and for mixtures of lithium perchlorate with lithium chloride in 95:5 and 50:50 mole percent ratios, and FIGURE 2 illustrates the curves for extent of decomposition plotted against time for pure lithium perchlorate and for mixtures of lithium perchlorate with silver nitrate and with silver perchlorate.

With respect to retarding the decomposition of the perchlorates, the effect of silver salts found in accordance with this invention is surprising and unexpected, and appears to be specific for lithium perchlorate. As noted above, in general thermal decomposition of perchlorate salts is easily catalyzed or accelerated by the presence of heavy metal salts. The addition of silver salts to potassium and ammonium perchlorates accelerates the decomposition of these compounds. On the other hand, as stated, the reverse effect is found to be exhibited by a silver salt in combination with lithium perchlorate, and the decomposition rate is, indeed, very greatly decreased, thereby. So far as applicant is aware, the inhibition of decomposition of lithium perchlorate has never been achieved satisfactorily heretofore, so that the present discovery is not only unexpected, but unique.

Referring to the acceleration of the decomposition of the lithium perchlorate, the present discovery that lithium chloride has a catalytic acceleratory effect is also unexpected. Studies have been made hitherto on decomposition of ammonium perchlorate which indicate that lithium chlorate may act as a decomposition rate accelerator for this ammonium salt. The lithium chlorate, at the temperatures where the decomposition rate of lithium perchlorate is significant (about 400 to 450° C.) is a source of lithium chloride: the chlorate decomposes rapidly at about 370° C. under such conditions, losing oxygen and forming the chloride. However, it is at a temperature of about 220° C., well below the chlorate decomposition temperature, that ammonium perchlorate decomposition is accelerated by lithium chlorate. Lithium chlorate will form chlorate radicals readily, particularly in a kinetic sequence as involved in ammonium perchlorate decomposition, and act as an electron donor to facilitate the radical formation involved in the ammonium salt decomposition. However, at temperatures as involved in the lithium perchlorate decomposition, lithium chlorate would decompose and this very rapidly, so that chlorate radicals would not be available, thus interfering with a mechanism involving electron transfer as in the ammonium salt systems. In fact, it is rather as a source of lithium chloride, produced by such decomposition of the chlorate, that the chlorate acts as a decomposition rate accelerator for lithium perchlorate.

That lithium chloride or a source thereof such as lithium chlorate has a catalytic accelerating effect on the decomposition of lithium perchlorate is particularly valuable in that lithium chloride is a decomposition product of lithium perchlorate. Therefore, addition of lithium chloride (or the chlorate, which forms only oxygen and lithium chloride) as a decomposition rate accelerator to lithium perchlorate is particularly advantageous, in that it introduces no extraneous elements or materials into the decomposition product. Upon thermal degradation, pure lithium perchlorate would liberate oxygen leaving a residue of lithium chloride. Thus, when lithium chloride is employed in accordance with this invention in admixture with lithium perchlorate to form a composition susceptible to thermal decomposition to liberate oxygen at a controlled rapid rate, faster than it is liberated by lithium perchlorate itself, the resulting decomposition residue is none other than would be obtained with pure lithium perchlorate.

Furthermore, lithium chloride contains a high weight percentage of chlorine and thus as a catalyst does not require that the perchlorate have a high percentage of adulteration with inert materials to produce the desired effect.

Furthermore, it has been found that the presence of lithium chloride can eliminate the induction period observed in thermal decomposition of lithium perchlorate. Thus, after about 400 minutes at 395° C., lithium perchlorate is only about 10% decomposed. However, when a 95/5 mol-percent lithium perchlorate/lithium chloride mixture is heated to the same temperature, decomposition of the lithium perchlorate is about 10% complete in only about 80 minutes, and when a 50–50 mol-percent mixture of lithium perchlorate and lithium chloride is heated to this temperature, decomposition of the lithium perchlorate is about 10% complete in only about 20 minutes. In fact the decomposition-time curves of the 50–50 mol-percent mixtures are completely deceleratory.

Thus, this invention provides novel and highly advantageous methods of varying the decomposition rate of lithium perchlorate within wide limits to suit the requirements of given operations.

Referring now to the practice of this invention, this will comprise heating lithium perchlorate to a temperature sufficient to initiate thermal decomposition thereof in the presence of a decomposition rate control agent selected from the class consisting of a source of an inorganic chloride and a heavy metal salt other than a chloride, the choice depending on whether it is acceleration or deceleration of the rate of decomposition which is required.

Where it is a decrease in the decomposition rate which is desired, lithium perchlorate will be combined with an additive which, broadly expressed, is a heavy metal salt. The useful salts are those which are themselves stable in molten lithium perchlorate. A further characteristic of the useful salts of heavy metals is an ability to react or complex with a water-soluble chloride such as lithium chloride, and the useful salts are salts other than the chlorides of heavy metals. By a heavy metal is meant a metal having a specific gravity greater than four, such as silver, rhodium or lead. Silver salts are particularly preferred. Any of a very wide variety of silver salts may be employed for the present purposes. The inorganic silver salts are advantageously employed for the sake of economy. Illustrative of salts having the stated characteristics are silver nitrate and silver perchlorate, silver fluoride, silver oxide and peroxide, silver orthophosphate and pyrophosphate, silver sulfate, and so forth. Where the possibility of reaction between the organic component and the oxidant is not objectionable, organic salts such as silver acetate, citrate, tartrate, oxalate and the like may be employed.

Where lithium perchlorate decomposition is to be accelerated, an inorganic salt containing chlorine in the anion thereof will be added thereto in accordance with this invention. Broadly expressed, the invention comprises the use of any of a variety of such inorganic salts which, at temperatures employed in the decomposition process, are a source of chlorides characterized by the ability to react with a silver salt to yield silver chloride. Such chlorides include, for example, alkali metal salts such as sodium chloride and lithium chloride, other metal chlorides such as iron chloride, and so forth. Exemplary of sources of such chloride ions are chlorates decomposing relatively rapidly at temperatures below about 350–400° C., such as lithium chlorate.

Referring to the amount of the decomposition rate controlling material to be employed in combination with lithium perchlorate, this will be sufficient to exert a significant effect on the decomposition rate. By varying the amount of the additive, the extent of effect on the decomposition rate can be varied, and accordingly, this invention can be practiced using a variety of concentrations where the concentration is referred to the combined amounts of lithium perchlorate and additive.

For example, the concentration of the additive may be as low as about 0.05 mol-percent or even less. Generally at least about 1 mol-percent will be employed. The maximum can also vary. The compositions used in practicing this invention will usually contain at least 10 mol-percent lithium perchlorate. Generally it will be impractical to employ less than about 25 mol-percent lithium perchlorate. When lithium chloride is used to accelerate the decomposition rate of lithium perchlorate, at 50–50 mol-percent mixtures of lithium chloride and lithium perchlorate, the decomposition-time curve at about 400° C. is completely deceleratory, and no further advantage is achieved, in fact, by increasing the percentage of lithium chloride. At any temperature, the effectiveness of the LiCl catalyst is limited by its solubility in the melt; thus increasing the solubility should also increase the effectiveness by permitting an increased concentration in homogenous solution in the melt. Referring to the use of silver salts to retard the decomposition rate of lithium perchlorate, less than 10 mol-percent of silver nitrate prolongs the time required for complete decomposition of lithium perchlorate to more than seven times that required by pure lithium perchlorate at the same temperature, so that it can be seen that high ratios of inhibitory additive are also generally not necessary to achieve the desired effect. However, the more additive is used, the longer the time is prolonged.

Thus, the compositions provided by this invention comprising a silver salt combined with lithium perchlorate may advantageously be formed by combining, say, from about 1 mol-percent to about 25 mol-percent of a silver salt such as the nitrate with lithium perchlorate. It is the content of silver in the salt which is important, and where the silver ion provides less than half of the weight of the salt selected, correspondingly more salt compared to the nitrate should be employed to produce equivalent results.

In practicing the method of this invention, the lithium perchlorate will simply be mixed with the selected additive and the mixture raised from ambient or room temperature to a temperature sufficient to initiate the thermal decomposition of the lithium perchlorate. To achieve a measurable rate of decomposition, the mixture should be heated initially to a temperature of about 400° C. Decomposition can be continued subsequently by maintaining the mixture at somewhat lower temperatures. Such temperatures, sufficient to keep the decomposition going at a measurable rate after its initiation, will be at least above about the melting point of pure lithium perchlorate (247° C.), and preferably, at least about 300° C. The higher the temperature, the greater the rate of decomposition, and at about 450° C., the rate of decomposition of pure lithium perchlorate is rapid. Thus, temperatures above about 500° C. will generally not be necessary, but may be used if desired in systems including the perchlorate and additive mixture.

Reference has been made herein to systems comprising lithium perchlorate, in which the rate of oxygen evolution or decomposition rate of the perchlorate or systems comprising it may be controlled in accordance with the invention. Such systems may be exemplified, for example, by an explosive or propellant composition comprising an oxidizable material such as a hydrocarbon, like methane, butane or isooctane, lithium perchlorate, and decomposition rate controlling additive in accordance with the present invention.

To measure the decomposition rate of the lithium perchlorate in combination with the selected type and amount of additive, for the purpose of determining whether a specific desired decomposition rate has been achieved, a boat, test tube or the like, inserted in a laboratory furnace, may be used, for example. The loss of weight or increase in gas volume due to the release of oxygen from the decomposition of the lithium perchlorate can be followed to determine the extent of decomposition which has occurred, or the mixture may actually be analyzed if desired. In practical use of the method of the invention to achieve a controlled rate of release of oxygen, the lithium perchlorate may for example be heated in an environment where the oxygen evolved from it will contact a material to be oxidized, as in a rocket propellant system.

In illustrative operations, pure lithium perchlorate is exposed to a temperature of 452° C., at which its decomposition rate is relatively rapid. The time required for complete decomposition is measured, and is found to be 26 minutes.

A mixture of 75 parts by weight of lithium perchlorate and 10 parts by weight of silver nitrate is now prepared and exposed under the same conditions to a temperature of 452° C. The time required for complete decomposition of the lithium perchlorate is measured and found to be 196 minutes.

Substituting silver perchlorate for the silver nitrate, similar stabilization effects are found at an equivalent silver content, whereby the time required for complete decomposition of the lithium perchlorate is greatly prolonged.

The data obtained are presented graphically in FIGURE 2, in which extent of decomposition of the lithium perchlorate is plotted against elapsed time for each of the stated three runs. It will be noted that different temperature scales are used for decomposition of the pure lithium perchlorate and of its mixtures with the additives for the sake of clarity in minimal space; plotted on the same time scale, the difference would be even more strikingly evident.

Experiments wherein acceleration of the decomposition rate of lithium perchlorate is demonstrated are conducted at a lower temperature, at which lithium perchlorate heated alone decomposes only very slowly. The data obtained are presented in the FIGURE 1, graphically. They are obtained by heating a mixture of 95 mol-percent lithium perchlorate and 5 mol-percent lithium chloride, and a second mixture, of 50 mol-percent lithium perchlorate and 50 mol-percent lithium chloride, each to a temperature of about 395–396° C. For comparison, the same data are taken for heating pure lithium perchlorate to the same temperature. The extent of decomposition of the lithium perchlorate is measured at intervals, and the data plotted as percent decomposition against time.

It will be noted that the time scale for decomposition of the pure lithium perchlorate is so much more drawn out than that for the decomposition of mixtures of lithium perchlorate with lithium chloride in accordance with this invention that separate time scales at the top and bottom of the figure have ben used. If the same time scale were used for the pure lithium perchlorate and for the mixtures with lithium chloride, it would be even more strikingly evident how the characteristic decomposition-time curve is being accelerated. With the pure lithium perchlorate, there is a long induction period followed by rapid acceleration and finally slow decay. In the characteristic decomposition-time curve for the 95/5 mol-percent mixtures of lithium perchlorate and lithium chloride, the induction period is eliminated, leaving only the acceleration and decay sections, and the decomposition is 90% complete within 540 minutes. The 50/50 mol-percent mixtures exhibit decomposition-time curves which are completely deceleratory, and the decomposition is 80% complete in 280 minutes.

Substituting lithium chlorate as a source of lithium chloride for the lithium chloride in the above-described experiments at an equivalent chlorine content, similar rate accelerating effects are observed.

While the invention has been described with reference to various particular preferred embodiments above, it will be appreciated that modifications and variations can be made within the scope of the invention as defined in the appended claims.

What is claimed is:

1. The method of producing decomposition of lithium perchlorate at a rate different from that of pure lithium perchlorate which comprises raising the temperature of a mixture of lithium perchlorate and a decomposition rate controlling additive selected from the class consisting of lithium chloride, lithium chlorate, silver nitrate and silver perchlorate, said additive being present in said mixture in an amount of at least 0.05 mol percent and below 90 mol percent, based on said mixture, said raising of the temperature being initially to at least 400° C. to initiate decomposition and the temperature of the mixture thereafter being maintained at at least 247° C.

2. The method of claim 1 wherein, after said initiation of decomposition, the temperature of the mixture is maintained at at least 300° C.

3. The method of claim 1 wherein said decomposition rate controlling additive is present in said mixture in an amount between about 1 mol percent and about 75 mol percent, based on said mixture.

4. The method of claim 1 wherein said decomposition rate controlling additive is silver nitrate and is present in said mixture in an amount between about 1 mol percent and about 25 mol percent, based on said mixture.

5. A composition adapted to release oxygen by thermal decomposition of lithium perchlorate at a controlled rate substantially slower than that of pure lithium perchlorate at the same temperature, comprising a mixture of lithium perchlorate and a silver salt selected from the group consisting of silver nitrate and silver perchlorate, the latter being present in said mixture in an amount of at least 0.05 mol percent and below 90 mol percent, based on said mixture.

6. The composition of claim 5 wherein said silver salt is present in said mixture in an amount between about 1 mol percent and about 75 mol percent, based on said mixture.

7. The composition of claim 6 wherein said silver salt is silver nitrate.

8. The composition of claim 7 wherein said silver nitrate is present in said mixture in an amount between about 1 mol percent, and about 25 mol percent, based on said mixture.

9. The composition of claim 5 wherein said silver salt is silver nitrate.

10. The composition of claim 6 wherein said silver salt is silver perchlorate.

References Cited by the Examiner
UNITED STATES PATENTS 2,970,045   1/61   Leatherman _____ 44—3

JULIUS GREENWALD, *Primary Examiner.*

ALBERT T. MEYERS, *Examiner.*